Figure 4:
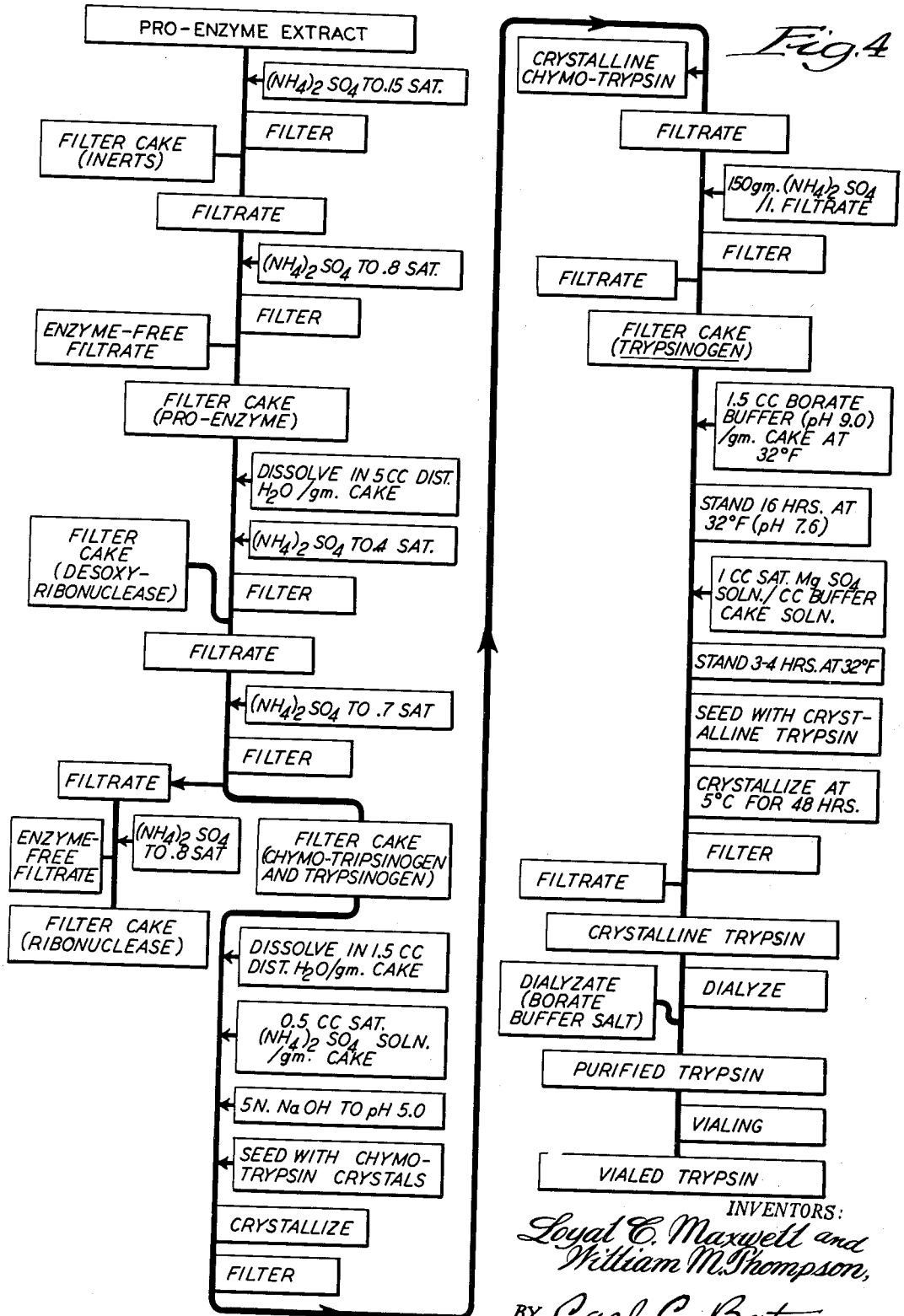

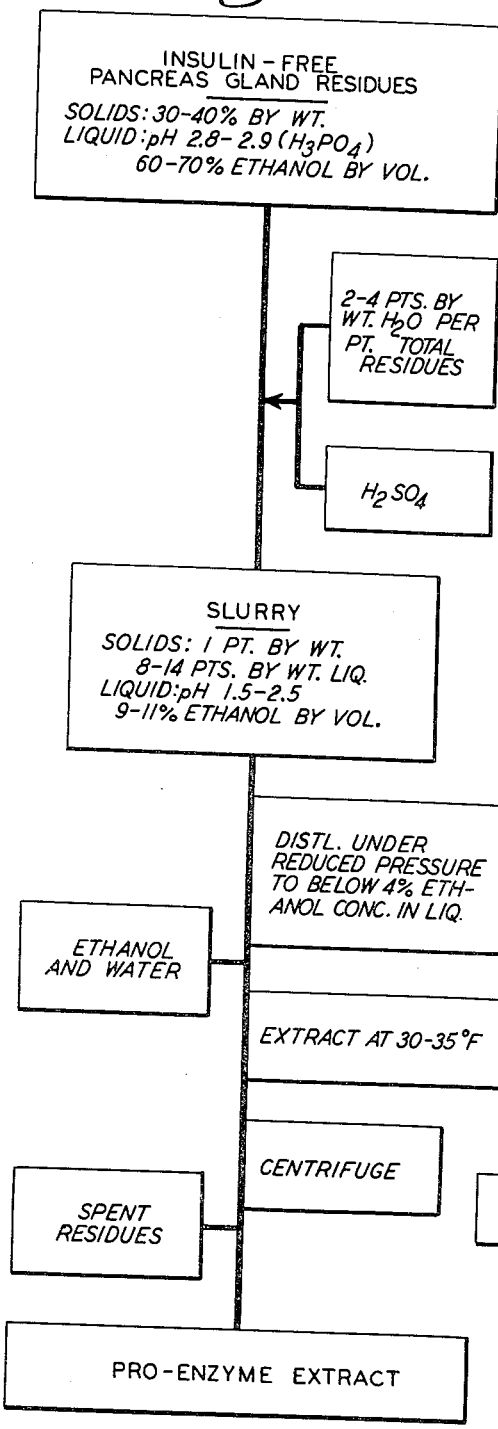
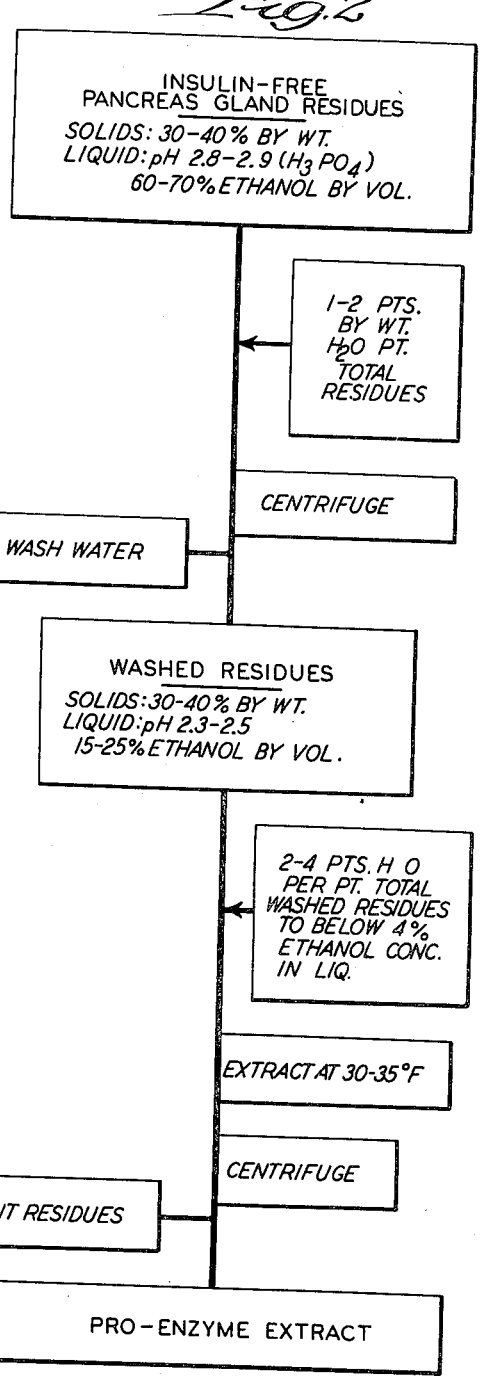

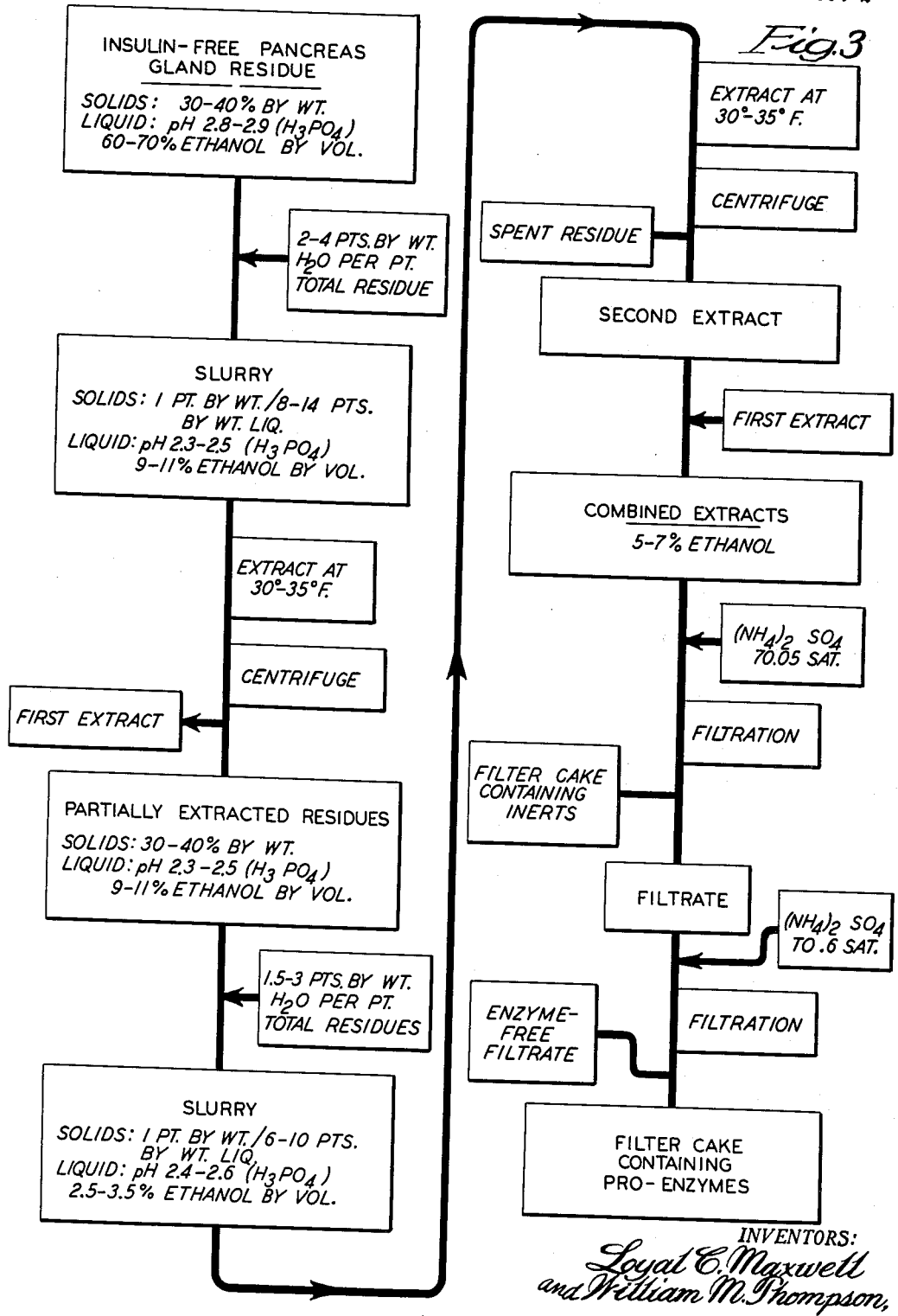

June 19, 1956

L. C. MAXWELL ET AL 2,751,329

PREPARATION OF PANCREATIC ENZYMES-RIBO
NUCLEASE, TRYPSINOGEN, CHYMOTRYPSIN
B AND ALPHA CHYMOTRYPSIN

Filed July 26, 1952

3 Sheets-Sheet 3

INVENTORS:
Loyal C. Maxwell and
William M. Thompson,

BY Carl C. Batz
ATTORNEY.

United States Patent Office 2,751,329
Patented June 19, 1956

2,751,329

PREPARATION OF PANCREATIC ENZYMES—RIBONUCLEASE, TRYPSINOGEN, CHYMOTRYPSIN B AND ALPHA CHYMOTRYPSIN

Loyal C. Maxwell and William M. Thompson, Chicago, Ill., assignors to Armour and Company, Chicago, Ill., a corporation of Illinois Application July 26, 1952, Serial No. 301,122

17 Claims. (Cl. 195—66)

This invention relates to the preparation of trypsin and other proteolytic enzymes from insulin-free pancreas gland residues, and is particularly concerned with the preparation of trypsin from such residues in crystalline form suitable for medicinal use. This invention is also concerned with the preparation of other proteolytic enzymes from pancreas gland residues in either crystalline or amorphous form, such as chymotrypsinogen-B, chymotrypsin, and ribonuclease.

The present application is a continuation-in-part of our co-pending application United States Serial No. 259,091, filed November 30, 1951, for Recovery of Proteolytic Enzymes from Pancreas Gland Residues Subsequent to Insulin Removal.

The pancreas glands of mammals contain insulin and proteolytic enzymes. The pancreas glands of cattle, hogs, and sheep are available in sufficient quantity for commercial use. Enzyme preparations such as pancreatin have been obtained from fresh pancreas glands of these animals for a number of years. The pancreatin preparations consist of a mixture of amphorous enzymes and are used primarily in the textile and tanning industries. Pure crystalline enzymes have also been prepared on a laboratory basis from fresh pancreas glands.

Insulin is also extracted from fresh pancreas glands. It has been found necessary to use an extraction solvent adapted to keep the proteolytic enzymes inactive and insolubilized during the extraction of the insulin. The activation of the enzymes causes destruction of the insulin, and the solubilization of the enzymes contaminates the insulin extract. The practice is to use an extraction solvent containing water and a major proportion of a water-miscible organic solvent for insulin acidified to below pH 4. Methanol, ethanol and acetone when used in concentrations of between about 50 to 85% by volume are the preferred organic solvents, but other lower alcohols and ketones can be employed. Ethanol is used almost exclusively in the United States because of its availability. Various acids can be employed to adjust the extracting solvent to the desired pH, such as sulfuric, hydrochloric, phosphoric and oxalic acids.

The insulin-free residues are generally separated from the insulin extract by centrifugation. For many years these residues were discarded, and no effort was made to recover any enzyme preparations therefrom. This has been due to the belief that the high concentrations of organic solvent and/or low pH's "destroyed" the proteolytic enzymes. Recently, however, these residues have been used as a source of enzyme preparations similar to pancreatin. For this purpose it has been thought sufficient to reduce the organic solvent concentration to below about 20% by volume while extracting the enzymes into an aqueous solvent. In spite of repeated efforts to obtain this result, heretofore no way has been found of preparing crystalline enzymes, such as crystalline trypsin, from insulin-free pancreas gland residues.

It is therefore a primary object of this invention to provide a method for preparing crystalline enzymes and particularly crystalline trypsin from insulin-free pancreas gland residues. It is also an object of this invention to prepare crystalline enzymes from pancreas gland residues with the highest possible yields and at a relatively low cost. Further objects and advantages will appear as the specification proceeds.

The proteolytic enzymes are present in fresh pancreas glands in an inactive form. More specifically, the fresh glands contain pro-enzymes which are the precursors of the active enzymes. For example, trypsinogen and chymotrypsinogen which are present in the fresh pancreas glands are the precursors respectively of trypsin and chymotrypsin. For the sake of simplicity of description in the following specification and claims, the terms "enzymes" and "proteolytic enzymes" will be used to refer to both the pro-enzymes and the active enzymes. However, when the active or inactive forms of the enzymes are important and not apparent from the context, more specific terminology will be employed.

It is believed that the important features of the present invention for accomplishing the objects stated above reside in the reduction of the organic solvent concentration of the residues to a critically low value while extracting the proteolytic enzymes from the residue solids into an aqueous extraction solvent of limited total volume, and then treating the separated extract to first salt out the impurities and then to salt out the enzymes.

As previously indicated, the starting material for the process of this invention is insulin-free pancreas gland residues. These residues contain solid pieces of glandular material generally about $\frac{1}{10}''$ to $\frac{1}{2}''$ in diameter suspended in an aqueous liquid having a pH below 4 and containing more than 50% by volume of a water-miscible organic solvent for insulin, such as methanol, ethanol and acetone. These residues are usually separated from the supernatant in the insulin extraction process by centrifuging, which results in the production of residues containing an approximately constant ratio of solids to liquid. Generally, the residues will contain about 30 to 40% by weight of solids, or in other words 60 to 70% of the residues will be liquid containing the high concentration of organic solvent. Somewhat drier residues may sometimes be obtained, and these may possibly contain as little as 50% liquid. However, the residues as obtained from the insulin extraction process can be expected to contain a sufficiently uniform ratio of solids to liquid in a given plant operation so that it is not necessary to determine the ratio of liquid to solids in the residues for each batch of residues to satisfactorily carry out the following process.

In one of its phases this invention contemplates the extraction of residues of the character described with an aqueous extraction solvent containing not over 4% by volume of organic solvent. As indicated above, it was formerly thought that it was sufficient to reduce the concentration of the ethanol or other organic solvent in the liquid portion of the residues to less than 20% to solubilize and extract the enzymes. However, it has now been discovered that the extraction of the enzymes is facilitated and that a more complete extraction can be obtained by reducing the concentration of the organic solvent to at least 4%. Also, it is believed that the use of critically low organic solvent concentrations is related to the production of crystalline enzymes.

In another of its phases, this invention contemplates the use of limited volumes of the extraction solvent containing the critically low concentration of organic solvent. It is believed that the preparation of crystalline enzymes is facilitated by employing relatively small volumes. Although the reasons for this are not fully understood, it is believed that one result of using limited volumes in the extraction step is to minimize the extraction of inert contaminants or possibly partially denatured enzymes which interfere with the crystallization of the enzymes. Preferably, not over 14 parts by weight of extraction solvent are used for each part of solids in the residue. For convenience of handling and particularly to permit a pumping of the extraction mixture at least about 6 parts by weight of liquid to each part of solids is desirable. Optimum results appear to be obtained when the extraction mixture contains between about 9 to 11 parts by weight of the extraction solvent to each part of the solids.

Still another phase of this invention contemplates the use of pancreas gland residues resulting from an insulin extraction process in which the extraction solvent contains from 50 to 85% of ethanol acidified to below pH 4 with either phosphoric or oxalic acids. In conjunction with phosphoric and oxalic acids, the preferred concentration of ethanol in the insulin extraction solvent is between about 60 to 70%. The extraction of insulin with solvents of this character acidified with phosphoric acid is described in detail in co-pending application United States Serial Number 158,298, filed April 28, 1950, now U. S. Patent No. 2,595,278, and the use of oxalic acid as the acidification agent is described in co-pending application United States Serial No. 244,281, filed August 29, 1951, now U. S. Patent No. 2,674,560. It is believed that the preparation of crystalline enzymes from pancreas gland residues is facilitated by employing residues obtained from either an ethanol-phosphoric acid or an ethanol-oxalic acid extraction of insulin.

The slurry for the extraction step having the preferred ratio of liquid to solids and having the desired concentration of organic solvent in the liquid portion can be formed in a number of ways. However, the method of adding water to the residues until the organic solvent concentration therein is reduced to the desired values cannot be used successfully to produce a slurry of the desired characteristics unless additional steps are taken. To produce a slurry having an organic solvent concentration in the liquid portion of less than 4% by volume from residues containing from 60 to 70% liquid by weight of 50 to 85% organic solvent concentration would require the use of excessively large volumes of water. Therefore, it is preferred to form the slurry for use in the process of this invention in a manner which involves the removal of a portion of the organic solvent from the residues so that the extraction mixture contains only a fraction of the ethanol or other organic solvent originally present in the residues. This can be accomplished by subjecting the residues to distillation under reduced pressure in either a vacuum still or a vacuum tray drier. If a still is employed, most of the water desired in the final slurry can be added prior to the distillation step with the result that the extraction of the enzymes can proceed simultaneously with the removal of a portion of the organic solvent. With the tray drying procedure it is preferred to add the water required to form the extraction mixture after the evaporation of the required amount of the organic solvent. The details of the formation of an extraction mixture of the character preferred for the process of this invention by distillation of the residues under reduced pressure are described in our co-pending application United States Serial No. 259,091 cited above.

Briefly, one desirable method of forming the slurry as set out in the cited application is to add from 6 to 14 parts of water to each part of residue solids. The mixture is then distilled under reduced pressure at a pH below 4 to decrease the organic solvent concentration therein to at least 4% by volume. The slurry resulting from this procedure is well adapted for use in the process of this invention. Because of the reduced pressure during the distillation the organic solvent can be removed from the mixture while leaving most of the water therein. Ordinarily, it is only necessary to remove about 2 parts of water with each part of organic solvent. For example, when from 6 to 14 parts of water have been added to each part of solids, the slurry subsequent to the distillation step may contain approximately 4 to 12 parts of liquid to each part of solids. Additional water can then be added if required to increase the ratio of liquid to solids in the slurry to at least 6 parts by weight of solvent to each part of solids. The distillation will also solubilize and extract from 60 to 80% of the enzymes. However, to carry the extraction to substantial completion, it is desired to subject the solids to further extraction into the liquid portion of the slurry by one of the methods which will subsequently be described.

Another method of forming an extraction mixture of the character desired for the process of this invention is to first wash the residues with a limited amount of water, and then separate the residues from the bulk of the wash water by centrifugation. The resulting residues will then have a considerably lower concentration of organic solvent in the liquid portion, and can be formed into an extraction mixture of the character desired by the addition of water thereto. The experimental work leading to this invention has disclosed that the extraction of the enzymes does not become appreciable with limited volumes until the organic solvent concentration is reduced to below about 15%. Therefore, in washing the enzymes to reduce the organic solvent concentration it is preferred not to reduce the organic solvent concentration to below 15% in the combined residues and wash waters. This washing step can be carried out satisfactorily by adding water to the residues to reduce the organic solvent concentration in the resulting mixture to between about 15 to 25% by volume. The mixture can then be centrifuged to remove the bulk of the wash water. The washed residues are then used to form the extraction mixture by adding water thereto until the organic solvent concentration is reduced to below about 4% by volume. With the usual residues obtained from an insulin extraction process, good results are achieved by adding from 1 to 2 parts by weight of water to each part of total residue, separating the residues from the wash water by centrifugation, and then adding from 2 to 4 parts by weight of water to each part of total washed residues.

In addition to the distillation and washing method described above, other methods can be employed. An excellent alternative method is to extract the residues twice: first at an organic solvent between 5 to 15%, and then at a concentration less than 4%. The two extracts can then be combined for further processing. Particularly good results are obtained by following the procedure outlined in the flow sheet of Figure 3.

After the formation of an extraction mixture or slurry containing the solids of the residues in contact with from 6 to 14 parts of liquid to each part of residue solids with the liquid portion containing not over 4% by volume of the organic solvent, the enzymes in the solids are extracted into the liquid portion. This can be accomplished by passing the slurry to suitable extraction equipment. For example, a jacketed tank equipped with an agitator can be satisfactorily employed. Cooling fluid is circulated through the tank jacket to maintain the slurry at a sufficiently low temperature to prevent activation and destruction of the enzymes, and the agitator is operated to maintain the solids in suspension and to cause them to circulate within the tank. From 24 to 48 hours will usually be required to carry the extraction of the enzymes to substantial completion by this procedure. However, the extration time can be considerably shortened by the use of sonic vibration techniques or other procedures for accelerating glandular extractions. Preferably, however, the slurry is circulated through an impeller-type pump, as described in co-pending application United States Serial No. 259,090, filed November 30, 1951, now U. S. Patent No. 2,686,148. By circulating the slurry repeatedly through an impeller-type pump, the extraction of the enzymes can be carried to completion in as short a time as 1 to 2 hours, including stirring periods between circulation cycles.

To prevent destruction of the enzymes during extraction, it is desired to maintain the pH of the slurry on the acid side, at least below pH 6.5. Preferably the pH of the slurry is maintained below pH 4, which has been found to substantially prevent activation of the pro-enzymes. Usually it will not be necessary to add additional acid to the slurry to adjust it to the preferred pH values because the residues from the insulin extraction will already contain a sufficient quantity of acid for this purpose. However, if desired additional acids can be added to the slurry such as hydrochloric, sulfuric, etc., and mixtures of acids can be employed to achieve the desired pH. The use of strong inorganic acids such as sulfuric and hydrochloric is particularly desirable when it is desired to subject the residues to distillation under reduced pressure, since it has been found desirable to maintain the pH between about 1.5 to 2.5 during the distillation step.

If the pH of the slurry is maintained below about pH 4, the temperature of the slurry is not especially critical for preventing destruction of the enzymes. In fact, temperatures as high as 50 to 55° F. can be satisfactorily employed. Preferably, the temperature of the extraction mixture is maintained below 40° F. The optimum temperature conditions for the extraction are between about 30 to 35° F. It is undesirable to bring about the formation of ice in the slurry which may be produced by the use of temperatures below 30° F.

Upon completion of the extraction, the spent residue solids are separated from the extract by centrifugation. The separated extract will then contain the enzymes in the form of their precursors which are termed the pro-enzymes as explained above. It has been found that crystalline enzymes can be prepared from the extract by salting out procedures using ammonium sulfate to precipitate the impurities and the enzymes in the desired order. The preferred procedure for the recovery of the enzymes is to first add ammonium sulfate in an amount sufficient to precipitate out most of the inert contaminants while leaving the enzymes in solution. In aqueous solutions having an organic solvent concentration below about 4% by volume, chymotrypsinogen–B which is the least soluble of the enzymes is precipitated out at an ammonium sulfate concentration of between about 0.25 to 0.4 saturation. Therefore, when it is desired to recover the chymotrypsinogen–B it is preferred to first adjust the concentration of the extract to about 0.1 to 0.2 ammonium sulfate saturation to precipitate the inert contaminants. The suspension is then filtered to remove the precipitate, and the filtrate is then treated with additional amounts of ammonium sulfate to precipitate one or more of the enzymes. Preferably, the entire enzyme spectrum is precipitated at this point. Ribonuclease is the most soluble of the enzymes precipitating out at about 0.7 to 0.8 ammonium sulfate saturation. Therefore, it is preferred to adjust the ammonium sulfate concentration of the filtrate to at least 0.7 saturation and preferably to 0.8 saturation to precipitate all of the enzymes. After the precipitation of the enzymes, they can be separated by filtration and the filter cake reworked to obtain as products the crystalline enzymes of standard potency and stabilized strength. The chymotrypsinogen and trypsinogen fraction is obtained at between about 0.4 to 0.7 ammonium sulfate saturation. Therefore, if it is not desired to recover the chymotrypsinogen–B, the chymotrypsinogen and trypsinogen enzymes can be precipitated by first adjusting the ammonium sulfate concentration to 0.4 saturation, separate the precipitate containing the inert contaminants, then adjust the concentration to 0.7 saturation to obtain a precipitate of the trypsinogen and chymotrypsinogen.

Three methods of carrying out the extraction process of this invention in accordance with the principles disclosed above are set out in the flow-sheets of the accompanying drawings. It will be understood that these flow-sheets are merely illustrative of various embodiments of this invention, and are not intended to set out all the procedural variations falling within the scope thereof. Figure 1 illustrates a method of obtaining a pro-enzyme extract from pancreas gland residues wherein a portion of the ethanol is removed by distillation under reduced pressure. Figure 2 illustrates an alternative embodiment of this invention in which a pro-enzyme extract of similar character is obtained by removing a portion of the ethanol by washing the pancreas residues. Figure 3 is another alternative embodiment in which the pancreas residues are extracted twice and the extracts combined. Figure 4 illustrates a method of recovering crystalline trypsin and other proteolytic enzymes from pro-enzyme extracts, such as those obtained by the procedures outlined in Figs. 1 to 3. To further illustrate the details of this invention, it is desired to set out the following examples:

*Example 1*

The enzymes were recovered from insulin-free beef pancreas residues by the following procedure: The residues contained about 70% liquid to 30% solids by weight, and the liquid portion was 65% ethanol by volume acidified to pH 2.85 with phosphoric acid. 1,000 lbs. of these residues were suspended in 400 gals. of tap water which contained 2200 cc. conc. $H_2SO_4$. After suspension had been accomplished, utilizing an impeller-type agitator, the slurry was pumped into the still. The distillation was made in a pot-type still, under vacuum, with a median temperature of 60–70° F. and a maximum of 85° F. 170 gallons of liquid, approximately 30% ethanol was removed in this step. The alcohol concentration of the still concentrate was approximately 1%. The concentrate was then diluted with 65 gallons of tap water in order to reach a consistency which could be circulated.

The diluted liquid was then transported back to its original tank and cooled to 40° F. Extraction was accomplished with two 30-minute circulations through a three bladed impeller-type pump. The suspension was slowly stirred with an impeller-type agitator for 15 minutes between and after circulation cycles. This action permitted the fat particles to coalesce before further extraction and processing. Clotted fat particles were removed during these steps by skimming. Separation of the liquid from the solid was accomplished in a Bird centrifuge of the cylindrical type.

The tissue from the first centrifugation was suspended in 225 gals. of tap water containing 340 cc. of $H_2SO_4$. The washing was accomplished by a 30-minute circulation through the impeller-type pump. The resultant suspension was then centrifuged and the effluent added to that obtained from the first separation.

To each gallon of extract was added 0.7 lb. of

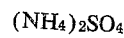

(NH$_4$)$_2$SO$_4$

This afforded a 0.15 saturation with the salt. The salt was added slowly in order to prevent a localized high concentration and a potential irreversible precipitation of protein. Impeller-type agitation for 45 minutes was found to be sufficient to effect complete dissolution of the salt.

The separation was accomplished in a Sperry-type press which had been pre-coated with Hyflo filter aid. The pH at this point (1.9–2.1 before salt addition) was found to be critical for there are semi-soluble materials present which, if not precipitated at this pH, not only clog the filter press, but also pass through in the effluent and interfere with subsequent processing. The press was washed with 50 gals. of water containing 35 lbs. of (NH$_4$)$_2$SO$_4$, 75 cc. of $H_2SO_4$ and 5 lbs. of filter aid to which the fat removed during the extraction and centrifugation steps has been added. This washing was followed by another 50-gal. portion of the previous washing solution. Air was blown through the press for four hours in order to complete recovery of the filtrate.

For each gallon of filtrate, 4 lbs. of (NH4)2SO4 was added whereby approximately 0.8 saturation with (NH4)2SO4 was obtained. Dissolution was completed by a 15-minute circulation through the impeller-type pump and flocculation was obtained after a 4-hour agitation with an impeller-type stirrer. This suspension was filtered through a Sperry-type press which had been pre-coated with filter aid. Hyflo filter aid was also added to the slurry; the total amount used being 12 lbs. The filtrate was a protein-free (NH4)2SO4 solution from which the salt can be recovered if desired. The filter cake was dissolved in an amount of distilled water equal to 5 cc. per gram of cake. The pH was adjusted to 2.8–3.3 and 150 g. (NH4)2SO4 was added per liter of solution. The addition was made slowly and the material was agitated vigorously for 15 minutes and allowed to settle for an additional 30 minutes. The press was washed with 10 liters of a 0.4 saturated (NH4)2SO4 solution. The precipitate, containing the chymotrypsinogen-B, was held at 23° F. for further processing.

To each liter of filtrate obtained from the above step 200 g. of (NH4)2SO4 was added. The resulting suspension was agitated for 15 minutes and allowed to flocculate over an additional 30-minute period. The material was then filtered and the precipitate removed to a temperature of 65° F. for further processing. This precipitate contained the crude trypsinogen and chymotrypsinogen.

In order to precipitate the crude ribonuclease remaining in the filtrate, 110 g. of (NH4)2SO4 was added and the filtered precipitate obtained therefrom was held at 23° F. for further processing.

The precipitate of crude trypsinogen and chymotrypsinogen previously described was dissolved in distilled water using 1.5 cc. H2O per gram of cake. Saturated (NH4)2SO4 solution was added on the basis of 0.5 cc. per gram of cake. This addition was made slowly while the material was agitated. The pH of the solution was then adjusted to 5.0 with 5 N NaOH. The solution was seeded with chymotrypsinogen crystals and held 16 hrs. at 65° F. for crystallization of the chymotrypsinogen. Separation was accomplished by vacuum filtration using filter aid. The chymotrypsinogen crystals were held at 23° F. for further processing.

Using the weight original cake of chymotrypsinogen and trypsinogen previously isolated as the basis for calculation, 1.5 cc. of distilled water per gram of cake was added to the filtrate from the last procedure. On the same basis, 1.5 cc. of saturated (NH4)2SO4 solution per gram of cake was added. The suspension which resulted after agitation of the mixture for 15 minutes followed by a settling period of 30 minutes was separated by filtration using filter aid and the precipitate was discarded.

The trypsinogen was precipitated from the filtrate by the addition of 150 grams of (NH4)2SO4 per liter of filtrate. After the previously described agitation and settling periods, the material was filtered. The trypsinogen cake was dried as completely as possible in preparation for crystallization. The trypsinogen cake was cooled to 45° F. by allowing it to stand in a metal pot placed in a freezer vault. Borate buffer solution (pH 9.0) was cooled to 60° F. by standing in the cold. The buffer solution was then mixed into the trypsinogen cake very slowly in the ratio of 1.5 cc. per gram of cake with minimal agitation at 32° F. The temperature should never rise above 50° F. This material was allowed to stand 16 hrs. at 32° F. at pH 7.6. One cc. of saturated MgSO4 solution per cc. of buffer-cake solution was added slowly, with continuous agitation. This solution was allowed to stand 3–4 hours at 32° F. The solution was seeded with crystalline trypsin and held at 5° C. for 48–72 hrs. for crystallization. The crystalline trypsin was then separated by filtration. The crystalline trypsin cake was solubilized in water, dialyzed in the cold to remove entrained salts, and either lyophilized in bulk or packed in vials in lyophilized form.

*Example II*

The procedure of Example I was substantially followed except that pork pancreas residues were substituted for the beef pancreas residues. Because of the greater fat or lipoidal pancreas glands (averaging 30 to 40% as compared to 5 to 10% for beef pancreas glands) special precautions were taken to prevent the fat from interfering with the recovery of the crystalline enzymes. Subsequent to the distillation step, the slurry was refrigerated to around 31° F., and maintained at this temperature during the pump extraction and centrifugation steps to promote clotting and separation of the fat particles.

Another modification in the procedure was the passing of the centrifugate into a small tank immediately after the separation of the spent residues. In this skimmer tank, the centrifugate was held up long enough to allow the fat particles, which had been further coalesced by the centrifugation, to rise to the surface and to be removed by skimming. In this way, a substantially fat-free extract was obtained.

*Example III*

If it is only desired to recover crystalline trypsin and chymotrypsin, the following procedure can be employed: the following procedure can be employed: Insulin-free pancreas residues are suspended in 4 volumes of pH 1.8 water acidified with hydrochloric acid. The pH is then readjusted to 1.8 with hydrochloric acid. The ethanol concentration is then decreased to 3% by distillation under reduced pressure. The enzyme extraction is then completed by passing the slurry into a tank within which it is extracted over a 48 hour period at 37° F. and at a pH of 1.8.

The tissue is then separated by centrifugation and discarded. To the centrifugate is added ammonium sulfate until a concentration of 0.4 saturation is reached. The resultant suspension is allowed to settle at 40° F. for 48 hours.

The suspension is then filtered and the precipitate containing the residual tissue is discarded. Sufficient ammonium sulfate is added to the filtrate to produce 0.7 saturation, and the resultant suspension is allowed to settle for 48 hours at 40° F. The crude enzyme precipitate is separated, and the filtrate is discarded.

The crude 0.7 saturated cake is reworked by dissolving it in 10 volumes of distilled water and refractionating it through the 0.4 and 0.7 saturated ammonium sulfate steps at 40° F., as described above. The 0.7 saturated cake obtained by these steps can be reworked again by dissolving it in 3 volumes of distilled water and refractionating through the 0.4 and 0.7 ammonium sulfate saturation steps at 70° F.

The 0.7 saturated cake thus obtained is dissolved in 1.5 volumes of distilled water at 70° F. Saturated ammonium sulfate solution is added to 0.25 saturation. The pH is adjusted to 5.0 with 5 N NaOH. The solution is inoculated with a small amount of chymotrypsinogen crystals, and allowed to stand at 70° F. until the chymotrypsinogen crystallization is complete; usually 48 to 72 hours will be required. The suspension is then filtered and the precipitate held at 23° F. until processed to crystalline chymotrypsin.

The pH of the filtrate subsequent to the separation of the crude chymotrypsinogen is adjusted to 3.0 with 5 N H2SO4. Ammonium sulfate is added to this solution to 0.7 saturation. The suspension is filtered and the supernatant discarded. The precipitate obtained is dissolved in 3 volumes of distilled water and reworked through a 0.4 and 0.7 ammonium sulfate saturation at 70° F. The 0.7 saturated precipitate, after thorough drying, is dissolved in 1.5 volumes of pH 9.0 borate buffer solution at 50° F. The pH of the solution is adjusted to 7.0 with 5 N NaOH and saturated magnesium sulfate solution is added to 0.5 saturation. The solution is held at 40° F. until crystallization of the trypsin is complete; usually 7 to 9 days will be required. The crystallization suspension is separated by filtration and the filtrate discarded. The crystalline trypsin cake may then be held at 23° F. if stored, or it may be suspended in 10 volumes of water and lyophilized directly.

The chymotrypsinogen is recrystallized by dissolving the chymotrypsinogen cake in 3 volumes of water and adjusting the pH between 2.5 and 3.0. A volume of 0.5 M phosphate buffer solution (pH 7.6) is added to the solution and 0.05 mg. crystalline trypsin is added for each 1.0 g. of chymotrypsinogen in order to activate the enzyme. The solution is allowed to stand 24–48 hours at 40° F. The pH of the chymotrypsin solution is then adjusted to pH 4.0 and the chymotrypsin is precipitated by adding ammonium sulfate to 0.7 saturation. The precipitate is removed by filtration and dissolved in 0.75 volume of 0.01 N $H_2SO_4$. It is then seeded, and allowed to crystallize at 70° F. for 8 hours.

The chymotrypsin is separated by filtration and recrystallized by dissolving the crystalline cake in 1.5 volumes of 0.01 N $H_2SO_4$ solution. Solution is seeded again and allowed to crystallize at 70° F. The crystalline material is removed by filtration and held at 23° F.

Example IV

The following procedure can be employed for recovering all of the enzymes from insulin-free pancreas gland residues containing from 30 to 40% by weight of solids and having a liquid portion acidified to below pH 4 and containing about 60 to 70% by volume of ethanol. Suspend 1,000 lbs. of these residues in 1,500 lbs of water. Thoroughly mix the slurry and separate the bulk of the liquid from the solids by centrifugation. Suspend the washed residues in 3,000 lbs of water. Extract the enzymes in the solids into the liquid portion of the slurry by circulating the slurry through an impeller-type pump for 30 to 60 minutes, either continuously or with an intervening period of from 5 to 15 minutes standing in a tank with general agitation. Alternatively, carry out the extraction by passing the slurry to a brine-jacketed extractor tank equipped with an agitator and hold the slurry in the tank for from 12 to 48 hours, while maintaining the temperature thereof between about 30 to 35° F. Separate the spent residues from the liquid portion of the slurry by centrifugation. Hold the separated extract at a temperature between about 30 to 35° F. if any delay is encountered before subsequent processing. Treat the extract thus obtained with ammonium sulfate in the manner described in Example I to obtain a crude enzyme cake substantially free of inert contaminants, and then rework the cake to obtain the enzymes.

Example V

Six pounds of frozen beef pancreas glands were hashed and added to 6000 cc. of 80% cold ethyl alcohol in which 140 grams of powdered oxalic acid crystals had been dissolved. After stirring, the pH of the extraction mixture was 2.8 and its temperature 50° F. The pancreatic tissue solids were removed by centrifugation and were reextracted in 5000 cc. of cold 65% alcohol containing 10 grams of oxalic acid. Following centrifugation of the second extraction mixture, the combined extracts were processed for insulin.

The insulin removed pancreatic residue amounting to 4 pounds at this point and having a liquid content of approximately 50% by weight was extracted, with stirring, for a period of 10 hours after the addition of 6 liters of cold water. The temperature was maintained at 40° F. and the pH was 2.4 so no further acid was necessary. The tissue solids were removed by centrifugation and reextracted in 3000 cc. of cold water for a period of two hours and the pancreatic insolubles removed as before. The combined aqueous extractants containing the pancreatic pro-enzymes and containing about 7% alcohol by volume, was filtered to clarity, and the pro-enzymes precipitated by the addition of sufficient ammonium sulphate to produce a concentration of 0.8% saturation in the solution. The precipitated proteolytic pro-enzymes were removed by filtration and resolubilized and further purified and activated by conventional procedures to recover crystalline trypsin and chymotrypsin in good yield.

Example VI

Six pounds of frozen beef pancreas were similarly extracted using oxalic acid to recover insulin as in Example V. The removed pancreatic tissue solids containing the pro-enzymes was added to 4000 cc. of water and the slurry so formed was subjected to distillation in vacuo at a temperature of 85° F. to remove alcohol. After removing about 1000 cc. of water and alcohol by distillation the material was removed from the still and chilled to 40° F. and stirred vigorously for three hours. The pancreatic solids were then removed by centrifugation and reextracted in 3000 cc. of cold water, adding sufficient oxalic acid to maintain the pH of 2.4, and stirring for 2 hours at a temperature of 40° F. The combined extracts after removal of suspended tissue extracts was further processed as in Example V to recover crystalline trypsin and crystalline chymotrypsin.

Example VII

In the foregoing examples, the trypsin is obtained in crystalline form. Sometimes additional purifying steps beyond those described will be desirable to prepare a pure crystalline product of stabilized potency and standardized strength. With particular reference to the procedure described in Example I, occasionally, after the trypsinogen cake has been dissolved in the borate buffer solution, and the magnesium sulfate solution added, noticeable gelatinization will appear in the standing solution, or the solution may be of dark color or dingy appearance. If any of these conditions occur, it is desirable to subject the solution to filtration before proceeding with the crystallization of the trypsin. Also, subsequent to the crystallization, the crystalline product may appear gummy or gelatinous. When this occurs, the separated crystalline solution should be centrifuged. The precipitate from the centrifugation should then be suspended in a minimal amount of pH 9.0 borate buffer solution. This suspension should then be filtered and dried as much as possible. The dry filter cake thus obtained can be stored at 23° F. indefinitely.

Example VIII

The following procedure has been found to be an excellent one for recovering all of the enzymes from insulin-free pancreas gland residues containing from 30 to 40% by weight of solids and having a liquid portion acidified to pH 2.8 to 2.9 with phosphoric acid and containing about 65% by volume of ethanol: Suspend 1000 lbs. of these residues in 3000 lbs. of water to produce a slurry containing approximately 1 part of solids by weight per 11 parts of liquid, and the liquid portion of the slurry being at a pH of about 2.3 to 2.5 ($H_3PO_4$) and containing 9 to 11% by volume of ethanol. Extract part of the enzymes in the solids into the liquid portion of the slurry by circulating the slurry through an impeller-type pump for from 30 to 60 minutes, either continuously or with an intervening period of from 5 to 15 minutes standing in a tank with the agitation. Alternatively, carry out the extraction by passing the slurry to a brine jacketed extractor tank equipped with an agitator and hold the slurry in the tank for from 24 to 48 hours. Maintain the slurry at a temperature between 30 to 35° F. during the extraction.

Separate the partially extracted residues from the liquid portion of the slurry by centrifugation. Hold the separated extract at a temperature between about 30 to 35° F.

for further processing. Suspend the partially extracted solids, which will still weigh approximately 1000 lbs., in 2000 lbs. of water to form a slurry containing about 1 part by weight of solids to 8 parts by weight of liquid, and the liquid portion being at a pH of about 2.4 to 2.6 ($H_3PO_4$) and containing 2.5 to 3.5% by volume of ethanol. Extract substantially all of the remaining enzymes in the solids into the liquid portion by the same means as employed in the initial extraction while maintaining the slurry within the same temperature range as previously.

Combine the second extract with the first extract to obtain solution containing about 5 to 7% by volume of ethanol, and slowly add 0.25 lb. of ammonium sulfate per gallon (.05% sat.) of the combined extracts with vigorous agitation in order to prevent a localized high concentration and a potential irreversible precipitation of protein. After dissolution of the salt followed by a settling period of approximately one hour, the precipitated inert material was filtered and discarded.

Adjust the ammonium sulfate concentration of the filtrate to 0.6 ammonium sulfate saturation by the addition, with mild stirring, of 3½ lbs. of ammonium sulfate per gallon of filtrate in the manner previously described. Allow the resulting suspension to settle for approximately one hour at 30 to 35° F. Separate the crude enzyme precipitate, containing the precursors of chymotrypsin-B, tryspin, chymotrypsin, and ribonuclease by filtration.

Dissolve the filter cake containing the crude enzymes in 5 cc. of distilled water per gram of cake, and adjust the pH to 2.8 to 3.3 if there is a deviation from this range. Add 150 g. ammonium sulfate per liter of solution to adjust the concentration of the slurry to 0.4 ammonium sulfate saturation. Make the addition slowly and with vigorous agitation. Continue the agitation for 15 minutes and allow the suspension to settle for an additional 30 minutes before starting the filtration. Then filter the suspension. Wash the filter cake with 10 liters of a 0.4 saturated ammonium sulfate solution. Hold the filter cake, containing the chymotrypsinogen at 23° F. for further processing.

Adjust the concentration of the filtrate to 0.7 ammonium sulfate saturation by adding about 200 g. of ammonium sulfate per liter of filtrate. The addition should be made in the usual manner set out above. Agitate the suspension for 15 minutes and allow it to flocculate over an additional 30 minute period. Filter the material and remove the filter cake, containing the purified trypsinogen and chymotrypsinogen, and hold it at a temperature of 65° F. for further processing. Adjust the concentration of the filtrate to 0.8 ammonium sulfate saturation by adding about 110 g. of ammonium sulfate per liter of filtrate. Agitate the suspension for 15 minutes and allow it to flocculate over an additional 30 minute period. Filter the material and hold the filter cake containing the crude ribonuclease at 23° F. for further processing.

Dissolve the precipitate of purified trypsinogen and chymotrypsinogen in 1.5 cc. of distilled water per gram of cake. Add 0.5 cc. of saturated ammonium sulfate per gram of cake, slowly, while the material is agitated. Adjust the pH of the solution to 5.0 with 5 N sodium hydroxide. Seed the solution with chymotrypsinogen crystals, and hold it for 16 hours at 65° F. for crystallization of the chymotrypsinogen. Separate the crystalline material by vacuum filtration, and hold the chymotrypsinogen crystals at 23° F. for further processing.

To the filtrate from the previous step add the following: (1) 1.5 cc. of distilled water per gram of original cake and (2) 1.5 cc. of saturated ammonium sulfate solution per gram of original cake. Agitate for 15 minutes and allow 30 minutes for settling. Filter the suspension and discard the precipitate. Add 150 g. of ammonium sulfate per liter of filtrate. Subject the suspension to the previously described agitation and settling periods, and filter the material. Dry the filter cake containing the trypsinogen as completely as possible in preparation for crystallization. Cool the trypsinogen cake to 45° F. Cool a borate buffer solution (pH 9.0) to 60° F., and mix 1.5 cc. of the solution per gram of the trypsinogen cake with minimal agitation at 32° F. Maintain the temperature below 50° F. at all times. Allow the material to stand 16 hours at 32° F. at pH 7.6. Add 1 cc. of saturated magnesium sulfate solution per cc. of buffer cake solution slowly with continuous agitation. Allow the solution to stand 3 to 4 hours at 32° F. If gelatinization appears in the standing solution, or if it is of dark color or dingy appearance, filter the solution. After the removal of the gelatinous material, or if the solution was originally of tan or light color, seed the solution with crystalline trypsin and hold it at 5° C. for 48 hours for crystallization. Separate the crystalline trypsin by filtration. If the crystalline solution appears gummy or gelatinous, subject it to centrifugation, and suspend the precipitate in a minimal amount of pH 9.0 borate buffer solution containing an equal volume of sat. magnesium sulfate solution. Filter this suspension and dry it as much as possible. Store the dry filter cake at 23° F. The crystalline trypsin can then be further purified if desired by dialysis to remove the borate buffer salt, and then packaged in vials.

While in the foregoing specification this invention has been described in considerable detail for purpose of illustrating specific embodiments thereof, it will be apparent to those skilled in the art that many of the details set forth can be varied widely without departing from the spirit of the invention.

We claim:

1. In a process for preparing pancreatic enzymes of the group consisting of ribonuclease and the proteolytic pro-enzymes trypsinogen, chymotrypsinogen B and alpha chymotrypsinogen from residues resulting from the extraction of insulin from pancreas glands with an acidified, water-miscible organic solvent for insulin, the steps of extracting the solids of said residues with an aqueous extraction solvent containing not over 4% by volume of said organic solvent, separating the solids from the extract, and then treating said extract with ammonium sulfate to fractionate and selectively separate said enzymes.

2. The process steps of claim 1 in which said organic solvent is ethanol.

3. In a process for preparing pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight at a pH below 4, said liquid containing from 50 to 85% by volume of a water-miscible organic solvent for insulin, the steps of forming a slurry containing the solids of said residues in admixture with from 6 to 14 parts by weight of an aqueous extracting solvent to each part of said solids, said extracting solvent containing not over 4% by volume of said organic solvent and being at a pH below 4, extracting the bulk of said enzymes into said extracting solvent to obtain an extract from which said enzymes can be recovered, separating the solids from said extract, and then fractionating said extract with ammonium sulfate to selectively separate said enzymes.

4. The process steps of claim 3 in which said organic solvent is ethanol.

5. In a process for preparing pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight at a pH below 4, said liquid containing from 50 to 85% by volume of a water-miscible organic solvent for insulin, the steps of forming a slurry containing the solids of said residues in admixture with from 6 to 14 parts by weight of an aqueous extracting solvent to each part of said solids, said extracting solvent containing not over 4% by volume of said organic solvent and being at a pH below 4, extracting the bulk of said enzymes into said extracting solvent to obtain an extract from which said enzymes can be recovered, separating the solids from said extract, adding ammonium sulfate to said extract in an amount sufficient to precipitate the bulk of the inert contaminants, separating the precipitated material from the extract, and then increasing the concentration of the ammonium sulfate in said extract to precipitate the enzymes.

6. In a process for preparing pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight at a pH below 4, said liquid containing from 50 to 85% by volume of a water-miscible organic solvent for insulin, the steps of forming a slurry containing the solids of said residues in admixture with from 6 to 14 parts by weight of an aqueous extracting solvent to each part of said solids, said extracting solvent containing not over 4% by volume of said organic solvent and being at a pH below 4, extracting the bulk of said enzymes into said extracting solvent to obtain an extract from which said enzymes can be recovered, separating the solids from said extract, adding ammonium sulfate to said extract to at least 0.1 saturation to precipitate inert contaminants, separating the precipitated material, and then increasing the concentration of the ammonium sulfate in said extract to at least 0.7 saturation to precipitate at least part of the enzymes, and recovering the precipitated enzymes.

7. In a process for preparing pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight at a pH below 4, said liquid containing from 50 to 85% by volume of a water-miscible organic solvent for insulin, the steps of forming a slurry containing the solids of said residues in admixture with from 6 to 14 parts by weight of an aqueous extracting solvent to each part of said solids, said extracting solvent containing not over 4% by volume of said organic solvent and being at a pH below 4, extracting the bulk of said enzymes into said extracting solvent to obtain an extract from which said enzymes can be recovered, separating the solids from said extract, adding ammonium sulfate to the extract to at least 0.1 saturation to precipitate the bulk of the inert contaminants, separating the precipitated material from the extract, increasing the ammonium sulfate concentration of the extract to about 0.8 saturation to precipitate substantially all of the enzymes at the same time, and recovering the precipitated enzymes.

8. In a process for preparation of pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight, said liquid being acidified to a pH of below 4 with an acid selected from the group consisting of phosphoric and oxalic acids and containing from 50 to 85% by volume of ethanol, the steps of extracting the solids of said residues with an aqueous extracting solvent containing not over 4% by volume of said ethanol, separating the solids from the extract, and then treating said extract with ammonium sulfate to fractionate and selectively separate said enzymes.

9. In a process for preparation of pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight, said liquid being acidified to a pH of below 4 with an acid selected from the group consisting of phosphoric and oxalic acids and containing from 50 to 85% by volume of ethanol, the steps of adding water to said residues to form a slurry containing the solids of said residues in admixture with from 6 to 14 parts by weight of an aqueous extracting solvent to each part of said solids, said extracting solids containing not over 4% by volume of said ethanol and being at a pH below 4, extracting the bulk of said enzymes into said extracting solvent to obtain an extract from which said enzymes can be recovered, separating the solids from said extract and then fractionating said extract with ammonium sulfate to selectively separate said enzymes.

10. In a process for preparing pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight, said liquid being acidified to below pH 4 with phosphoric acid and containing from 60 to 70% by volume of ethanol, the steps of adding water to said residues to form a slurry containing the solids of said residues in admixture with from 6 to 14 parts by weight of an aqueous extracting solvent to each part of said solids, said extracting solids containing not over 4% by volume of said ethanol and being at a pH below 4, extracting the bulk of said enzymes into said extracting solvent to obtain an extract from which said enzymes can be recovered, separating the solids from said extract and then fractionating said extract with ammonium sulfate to selectively separate said enzymes.

11. In a process for preparing pancreatic enzymes of the group consisting of ribonuclease and the proteolytic pro-enzymes trypsinogen, chymotrypsinogen B and alpha chymotrypsinogen from residues resulting from the extraction of insulin from pancreas glands with an acidified, water-miscible organic solvent for insulin, the steps of extracting the solids of said residue with an aqueous extracting solvent containing not over 4% by volume of said organic solvent, separating the solids from the extract, and then salting out said extract to fractionate and selectively separate said enzymes.

12. In a process for preparation of pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight, said liquid being acidified to a pH of below 4 with an acid selected from the group consisting of phosphoric and oxalic acids and containing from 50 to 85% by volume of ethanol, the steps of extracting the solids of said residues with an aqueous extracting solvent containing not over 4% by volume of said ethanol, separating the solids from the extract, and then fractionating said extract to selectively separate said enzymes.

13. In a process for preparing pancreatic enzymes of the group consisting of ribonuclease and the proteolytic pro-enzymes trypsinogen, chymotrypsinogen B and alpha chymotrypsinogen from pancreas gland material comprising enzyme-bearing glandular solids in intimate association with an acidified liquid containing water and at least 50% by volume of an organic solvent selected from the group consisting of methanol, ethanol, and acetone, the steps of reducing the concentration of said organic solvent in the liquid portion of said pancreas gland material to not over 4% by volume, extracting said enzymes into an aqueous extraction solvent containing not over 4% by volume of said organic solvent to obtain an extract from which said enzymes can be recovered, and then salting out said extract to fractionate and selectively separate said enzymes.

14. In a process for preparing pancreatic enzymes of the group consisting of ribonuclease and the proteolytic pro-enzymes trypsinogen, chymotrypsinogen B and alpha chymotrypsinogen from pancreas gland material comprising enzyme-bearing glandular solids in intimate association with a liquid containing water at a pH below 4 and from 50 to 85% by volume of an organic solvent selected from the group consisting of methanol, ethanol, and acetone, the steps of reducing the concentration of said organic solvent in the liquid portion of said pancreas gland material to not over 4% by volume, extracting the enzymes in said glandular solids into water by contacting said glandular solids with from 6 to 14 parts by weight of water containing not over 4% by volume of said organic solvent and being at a pH below 4, separating the solids from the extract thus produced, and then fractionating said extract with ammonium sulfate to selectively separate said enzymes.

15. In a process for recovering pancreatic enzymes of the group consisting of ribonuclease and the proteolytic pro-enzymes trypsinogen, chymotrypsinogen B and alpha chymotrypsinogen from pancreas gland material comprising enzyme-bearing glandular solids in intimate association with an acidified liquid mixture of water and at least 50% by volume of ethanol, the steps of extracting the solids of said pancreas gland material with an aqueous extracting solvent containing not over 4% by volume of ethanol, separating the solids from the extract, and then salting out said extract to fractionate and selectively separate said enzymes.

16. In a process for recovering pancreatic enzymes of the group consisting of ribonuclease and the proteolytic pro-enzymes trypsinogen, chymotrypsinogen B and alpha chymotrypsinogen from pancreas gland material containing at least 50% liquid by weight at a pH below 4, said liquid containing from 50 to 85% by volume of ethanol, the steps of forming a slurry containing the solids of said pancreas gland material in admixture with from 6 to 14 parts by weight of an aqueous extracting solvent to each part of said solids, said extracting solvent containing not over 4% by volume of said organic solvent and being at a pH below 4, extracting the bulk of said enzymes into said extracting solvent to obtain an extract from which said enzymes can be recovered, separating the solids from said extract, and then fractionating said extract with ammonium sulfate to selectively separate said enzymes.

17. In a process for recovering pancreatic enzymes of the group consisting of ribonuclease and the proteolytic pro-enzymes trypsinogen, chymotrypsinogen B and alpha chymotrypsinogen from pancreas gland material containing at least 50% liquid by weight acidified to a pH below 4 with an acid selected from the group consisting of phosphoric acid and oxalic acid, said liquid containing from 50 to 85% by volume of ethanol, the steps of reducing the concentration of said ethanol in the liquid portion of said pancreas gland material to not over 4% by volume, and then extracting the bulk of the enzymes in said glandular solids into water by contacting said solids with from 6 to 14 parts by weight of water containing not over 4% by volume of ethanol and being at a pH below 4, separating the solids from the extract thus obtained, and then fractionating said extract to selectively separate said enzymes.

References Cited in the file of this patent

UNITED STATES PATENTS 2,571,126   Frederickson _____ Oct. 16, 1951

FOREIGN PATENTS 618,174   Great Britain _____ of 1946

OTHER REFERENCES

Tauber: Chemistry and Technology of Enzymes, John Wiley and Sons, Inc., New York, 1949, page 148.